(12) United States Patent
Mohapatra et al.

(10) Patent No.: US 10,347,249 B2
(45) Date of Patent: Jul. 9, 2019

(54) ENERGY-EFFICIENT, ACCELEROMETER-BASED HOTWORD DETECTION TO LAUNCH A VOICE-CONTROL SYSTEM

(71) Applicant: The Regents of the University of California, Oakland, CA (US)

(72) Inventors: Prasant Mohapatra, Davis, CA (US); Li Zhang, Menlo Park, CA (US); Parth H. Pathak, Davis, CA (US); Muchen Wu, Davis, CA (US)

(73) Assignee: The Regents of the University of California, Oakland, CA (US)

( * ) Notice: Subject to any disclaimer, the term of this patent is extended or adjusted under 35 U.S.C. 154(b) by 259 days.

(21) Appl. No.: 15/498,835

(22) Filed: Apr. 27, 2017

(65) Prior Publication Data

US 2017/0316779 A1   Nov. 2, 2017

Related U.S. Application Data

(60) Provisional application No. 62/330,689, filed on May 2, 2016.

(51) Int. Cl.
| | |
|---|---|
| *G10L 15/00* | (2013.01) |
| *G10L 15/22* | (2006.01) |
| *G10L 15/08* | (2006.01) |
| *G10L 15/02* | (2006.01) |
| *G10L 15/06* | (2013.01) |

(52) U.S. Cl.
CPC .............. *G10L 15/22* (2013.01); *G10L 15/02* (2013.01); *G10L 15/063* (2013.01); *G10L 15/08* (2013.01); *G10L 2015/088* (2013.01); *G10L 2015/223* (2013.01)

(58) Field of Classification Search
CPC ........................................................ G10L 15/00
USPC ..... 704/275, 270.1, 257, 251, 226; 715/825; 382/103; 381/74
See application file for complete search history.

(56) References Cited

U.S. PATENT DOCUMENTS

| | | | | |
|---|---|---|---|---|
| 8,036,901 | B2 * | 10/2011 | Mozer | G10L 15/22 |
| | | | | 345/672 |
| 9,438,985 | B2 * | 9/2016 | Dusan | H04R 1/1083 |
| 9,535,906 | B2 * | 1/2017 | Lee | G06F 1/1626 |
| 9,842,101 | B2 * | 12/2017 | Wang | G06F 16/3322 |
| 9,858,925 | B2 * | 1/2018 | Gruber | G10L 15/18 |
| 2003/0233235 | A1 * | 12/2003 | Park | G06F 17/2755 |
| | | | | 704/257 |

(Continued)

*Primary Examiner* — Michael C Colucci
(74) *Attorney, Agent, or Firm* — Park, Vaughn, Fleming & Dowler LLP (57) ABSTRACT

The disclosed embodiments relate to the design of a system that uses an accelerometer in a mobile device to detect hotwords, which activate a voice interface to recognize subsequent voice input. During operation, the system gathers samples comprising readings from the accelerometer in the mobile device. Next, the system calculates features from the gathered samples. The system then classifies the calculated features using a classifier, which has been trained to detect hotwords based on calculated features. Finally, if the classifier detects one or more hotwords, the system causes the mobile device to launch a voice-control system that recognizes subsequent voice input received from an audio microphone.

27 Claims, 5 Drawing Sheets

(56) References Cited

U.S. PATENT DOCUMENTS

| | | | | |
|---|---|---|---|---|
| 2007/0033012 A1* | 2/2007 | Rosenberg | ............ | G06F 3/0346 |
| | | | | 704/206 |
| 2010/0131900 A1* | 5/2010 | Spetalnick | ............ | G06F 17/276 |
| | | | | 715/825 |
| 2010/0135527 A1* | 6/2010 | Wu | .................... | G06K 9/00664 |
| | | | | 382/103 |
| 2011/0307241 A1* | 12/2011 | Waibel | .................. | G10L 15/265 |
| | | | | 704/2 |
| 2013/0332156 A1* | 12/2013 | Tackin | ................ | H04M 1/6041 |
| | | | | 704/226 |
| 2014/0093093 A1* | 4/2014 | Dusan | .................... | H04R 3/005 |
| | | | | 381/74 |
| 2015/0340042 A1* | 11/2015 | Sejnoha | ............ | H04M 1/72519 |
| | | | | 704/275 |
| 2016/0012686 A1* | 1/2016 | Kuscher | .................. | G08B 5/36 |
| | | | | 704/251 |
| 2017/0215011 A1* | 7/2017 | Goldstein | ............ | H04R 25/305 |

\* cited by examiner

ENERGY-EFFICIENT, ACCELEROMETER-BASED HOTWORD DETECTION TO LAUNCH A VOICE-CONTROL SYSTEM

CROSS-REFERENCE TO RELATED APPLICATION

This application claims the benefit of U.S. Provisional Application Ser. No. 62/330,689, entitled "AccelWord: Energy Efficient Hotword Detection through Accelerometer," by inventors Li Zhang, Parth H. Pathak, Muchen Wu and Prasant Mohapatra, Attorney Docket Number UC16-825-1PSP, filed on 2 May 2016, the contents of which are incorporated by reference herein.

BACKGROUND

Field

The disclosed embodiments generally relate to voice-recognition systems. More specifically, the disclosed embodiments relate to the design of an energy-efficient voice-control system that uses an accelerometer to recognize a hotword that launches a voice-control system.

Related Art

With recent advancements in smartphone technology and the increasing popularity of wearable devices, voice control is emerging as an attractive method for interacting with smart devices. Voice-control applications, such as Siri™ on iOS™ devices and Google Now™ on Android™ devices, are commonly used by many smartphone and tablet users. Voice control is an especially attractive choice for wearable devices, such as smartglasses and smartwatches. Such devices have a very small touch-enabled screen, which restricts the applicability of touch-based control beyond a few primitive touch gestures. For this reason, voice control is commonly used in smartwatches and smartglasses. Voice control also provides tremendous potential because objects surrounding us in homes, offices and elsewhere are become increasingly more intelligent, and can operate under voice control to provide various capabilities, such as electronic assistance. Such devices are already becoming commercially available (e.g., a voice-controlled intelligent speaker that also acts as an electronic assistant).

Voice-controlled devices typically use special words called "hotwords," such as "Okay Google," and "Hi Galaxy," to activate a voice interface. Hotwords are commonly used to distinguish between a user's voice commands to the device and other types of speech. Hence, such voice-controlled devices continuously perform "hotword detection," which involves obtaining audio signals through a microphone and determining whether spoken words are hotwords. This continuous monitoring consumes a significant amount of power, which can be problematic for battery-powered mobile devices such as smartphones, smartwatches and smartglasses.

Hence, what is needed is a technique for performing hotword detection in an energy-efficient manner.

SUMMARY

The disclosed embodiments relate to the design of a system that uses an accelerometer in a mobile device to detect hotwords, which activate a voice interface to recognize subsequent voice input. During operation, the system gathers samples comprising readings from the accelerometer in the mobile device. Next, the system calculates features from the gathered samples. The system then classifies the calculated features using a classifier, which has been trained to detect hotwords based on calculated features. Finally, if the classifier detects one or more hotwords, the system causes the mobile device to launch a voice-control system that recognizes subsequent voice input received from an audio microphone.

In some embodiments, gathering the samples from the accelerometer additionally involves dynamically buffering the samples.

In some embodiments, prior to calculating the features, the system uses a high-pass filter to filter out user-mobility-related interference from the gathered samples.

In some embodiments, prior to gathering the samples, the system trains the classifier by: generating exemplary hotword signatures based on calculated features obtained from exemplary spoken hotwords; and using the exemplary hotword signatures to train the classifier to recognize hotwords in real time.

In some embodiments, the subsequent voice input comprises voice commands.

In some embodiments, launching the voice-control system involves: powering up the audio microphone; and powering up and/or initializing the voice-control system.

In some embodiments, after the voice-control system finishes recognizing the subsequent voice input, the system turns off the voice-control system, which involves: powering down the audio microphone; and deactivating and/or powering down the voice-control system.

In some embodiments, the accelerometer comprises a microelectromechanical systems (MEMS) accelerometer.

In some embodiments, the portable device comprises one of the following: a smartphone; a smartwatch; a running watch; an activity tracker; a smart speaker; and smartglasses.

The disclosed embodiments also relate to the design of a system that uses a gyroscope in a mobile device to detect hotwords, which activate a voice interface to recognize subsequent voice input. During operation, the system gathers samples comprising readings from the gyroscope in the mobile device. Next, the system calculates features from the gathered samples. The system then classifies the calculated features using a classifier, which has been trained to detect hotwords based on calculated features. Finally, if the classifier detects one or more hotwords, the system causes the mobile device to launch a voice-control system that recognizes subsequent voice input received from an audio microphone.

DETAILED DESCRIPTION

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), flash drives and other portable drives, or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Details

Existing voice-control applications often perform hotword detection to facilitate speech recognition. When this type of voice-control application is running, it constantly listens for the hotwords spoken by the user. Examples of such hotwords include "Okay Google" or "Hi Galaxy" for Google Now™ and Samsung S Voice™ applications, respectively. Once hotwords are detected, subsequent spoken words are recognized using a speech-recognition system. The purpose of using hotword detection instead of continuously recognizing every word a user speaks is that it is more computationally efficient. This is because hotword detection merely classifies the spoken words into two classes (the hotword and the other words) through lightweight speech signature matching instead of using more-complex speech-recognition techniques.

Although hotword detection requires less computation than complete speech recognition, both of these technique require the device's microphone to be turned on at all times. Constantly powering on the microphone makes existing voice-control applications very energy inefficient.

The disclosed embodiments describe a system called "AccelWord," which provides an energy-efficient solution for hotword detection by using an accelerometer. The design of AccelWord is based on the observation that the micro-electromechanical system (MEMS) accelerometers available in smartphones, smartwatches and nearly all smart devices are sensitive to user's spoken voice. When a user speaks, the generated audio signal causes variations in the observed acceleration in the accelerometer. In fact, these variations represent a user's spoken words surprisingly well, and it is possible to extract unique signatures of a user speaking hotwords simply from accelerometer data. Based on this, the AccelWord system was designed to perform hotword detection purely using accelerometer data, and to activate a microphone when the accelerometer data matches the extracted signature of a hotword.

Researchers have observed that MEMS accelerometers and gyroscopes are sensitive to a user's speech and keystrokes from a nearby keyboard, posing severe privacy risks. However, the AccelWord system is primarily concerned with how this sensitivity can be exploited to facilitate energy-efficient hotword detection. The AccelWord system addresses multiple challenges involved in accurate and energy-efficient hotword detection. First, because the effects of a user's voice on an accelerometer are monitored as the user's voice signals are modulated at a relatively low frequency (200 Hz in case of current accelerometers), it is not clear which features can be used to extract hotword signatures. For higher energy efficiency, it is desirable to keep the computational cost of calculating these features relatively low. To address this challenge, AccelWord uses low-complexity features, which are often used in activity-recognition operations (e.g., for walking, running, etc.) involving the accelerometer. Empirical results show that these low-complexity features can accurately distinguish hotwords from other spoken words.

The MEMS accelerometers found in smartphones and other smart devices have three main components: an inertial mass, spring legs, and stationary fingers. The inertial mass is anchored to the substrate using two pairs of flexible spring legs. When an acceleration is applied, the inertial mass moves, which causes a change in the capacitance between the stationary fingers. This change is recorded to accurately measure the acceleration. In a three-axis accelerometer, three separate sets of components are employed to measure the three accelerations separately. When a user speaks, the resultant acoustic signals strike the inertial mass of the accelerometer, causing it to move and report very small changes in acceleration. From the perspective of the accelerometer, such variations are typically considered undesirable noise, and researchers have studied effects of these variations and have proposed ways to combat such noise. Depending on the sampling frequency of the accelerometer, the acceleration changes can reflect some characteristics of a user's voice and the spoken words. A typical maximum sampling frequency of today's MEMS accelerometers is in the range of a few thousand Hz. However, smartphone operating systems typically restrict this maximum sampling frequency to 200 Hz to reduce power consumption.

This sampling frequency has important implications in terms of how the voice signal affects the accelerometer readings. The human ear can perceive any sound in the range of 20 Hz to 20 KHz. This is why a typical microphone has a sampling frequency over 40 KHz, because the Nyquist limit implies that the sampling frequency should be at least twice (>40 Hz) the highest frequency of the measured signal (20 Hz) to facilitate accurate signal reconstruction. This implies that with 200 Hz of sampling frequency for an accelerometer, the system cannot perfectly reconstruct the voice signal. However, the system does not have to perfectly reconstruct voice signal using the accelerometer. Such reconstruction requires a very high sampling rate, which can result in a high energy cost. Instead, the system generates signatures of different hotwords spoken by the user through the analysis of accelerometer readings available at a lower sampling frequency.

AccelWord is feasible because of the fact that a typical fundamental frequency of a male's speaking voice is between 85 Hz and 155 Hz, and a female's speaking voice is between 165 Hz and 255 Hz. This means that accelerometer data at the sampling frequency of 200 Hz can reflect some components of a human voice.

One design goal for the AccelWord system is accuracy. It is desirable for a hotword-detection scheme to be accurate. It is possible to define the accuracy of a hotword-detection scheme to be the ratio of the number of times a user's spoken hotwords are correctly detected to the total number of times the user speaks the hotwords. Accurately detecting hotwords is desirable for any voice-control application. Even though recent voice-control applications, such as Google Now™, achieve high levels of accuracy in hotword detection, the frequency of failures to detect a hotword is a major factor in limiting use of voice-control systems in smartphones and wearable devices.

Another important design goal is that a voice-control application should be robust in relation to its dynamic operating environment. This means that it should be robust during the hotword-detection process during the following three scenarios: (1) User mobility—It is desirable for hotword-detection accuracy to be high even when the device is in constant motion. For example, it is desirable for a smartwatch to detect a user's hotwords even when the user is walking. (2) Different voice frequencies (female or male)—It is desirable for the voice-control application to detect hotwords for both female and male users. Because a female voice generally comprises higher frequencies than a male voice, accuracy should ideally be unaffected by the input of such voice frequency variations. (3) Noisy surroundings—The ambient noise in a surrounding environment can adversely affect voice-input recognition, especially when the user is in noisy outdoor locations, such as malls, cafes, etc. Hotword detection accuracy should ideally be unaffected by such surrounding noise.

Another design goal is power savings. Existing voice-control applications consume a significant amount of energy. For ubiquitous deployment of a voice-control application in battery-operated smart devices, it is desirable that it operates with a small energy footprint. This requires that both hotword detection and subsequent sensing of voice input are energy-efficient.

The AccelWord system detects a user speaking hotwords by monitoring accelerometer data. In doing so, it uses statistical pattern and frequency analysis to create signatures of the hotwords based on the accelerometer readings. During operation of the AccelWord system, the accelerometer data is used to create signatures of hotwords. Based on the signatures, a machine-learning classifier is trained to perform the hotword detection. While creating the signatures of the hotwords using accelerometer data, the system only needs to distinguish the hotword from other spoken words of users. Hence, the hotword detection is a binary classification problem in terms of machine learning, and not a speech recognition problem where spoken words are reconstructed. Once a hotword is detected, the microphone can be turned on to record the user's voice and existing methods of speech recognition can be applied.

Using Features to Analyze Accelerometer Data

The disclosed embodiments can make use of activity-recognition-related features to analyze the accelerometer data. Such features are highly correlated with physical activities of humans, such as walking, running, sitting, standing, etc. A significant advantage of using these types of features over the audio-analysis-related features used in conventional speech-recognition systems is their lower computational complexity. In particular, the majority of features listed above can be calculated by performing a time-series analysis, which can be efficiently performed during fast online processing.

For example, the following activity-recognition-related features can be calculated for accelerometer signals for the X, Y and Z axes over a time window of t seconds. These features are related to either the time domain or the frequency domain.

Time Domain:

In the time domain, the following features can be calculated separately for each X, Y and Z axis.

Minimum, maximum, median, variance, standard deviation.

Range: difference between maximum and minimum, which is a measure of extreme changes in acceleration.

Absolute Mean (AbsMean): average of absolute values of acceleration.

CV: ratio of standard deviation and mean times 100, which is a measure of signal dispersion.

Skewness (3rd moment): measure of asymmetry in distribution of signal samples.

Kurtosis (4th moment): measure of peakedness in distribution of signal samples.

Q1, Q2, Q3: first, second and third quartiles, which collectively measure the overall distribution of accelerator magnitude over the window.

Interquartile range (ICR): difference between the Q3 and Q1, which also measures the dispersion of the signal.

Mean Crossing Rate (MCR): measures the number of times the signal crosses the mean value and thereby captures how often the signal varies during the time window.

Absolute Area (AbsArea): the area under the absolute values of the accelerometer signal. It is the sum of absolute values of accelerometer samples in the window. Let $a_s$ denote the $i^{th}$ sample of the accelerometer's s$\varepsilon$\{X, Y, Z\} axis, then $$AbsArea_s = \sum_{i=1}^{window\_length} |a_{s_i}|. \quad (1)$$

In the time domain, the following features are calculated across the X, Y and Z axes:

TotalAbsArea: sum of AbsArea of all three axes $$AbsArea_s = \sum_{i=1}^{window\_length} |a_{x_i}| + |a_{y_i}| + |a_{z_i}|. \quad (2)$$

TotalSVM: the signal magnitude of all accelerometer signals for the three axes averaged over the time window.

$$TotalSVM = \frac{\left[\sum_{i=1}^{window\_length} \sqrt{\sum_{s \in (X,Y,Z)} a_{s_i}^2}\right]}{window\_length} \quad (3)$$

In the frequency domain, the following features can be calculated separately for each X, Y and Z axis:

Energy: a measure of total energy in all frequencies. Let $m_i$ be the magnitude of FFT coefficients.

$$Energy = \sum_{i=1}^{window\_length/2} m_i^2 \quad (4)$$

Entropy: captures the impurity in the measured accelerometer data. Let $m_i$ be the normalized value of the FFT coefficient magnitude.

$$Entropy = -\sum_{i=1}^{window\_length} n_i \log_s(n_i) \quad (5)$$

DomFreqRatio: calculated as the ratio of the highest magnitude FFT coefficient to the sum of the magnitude of all FFT coefficients.

To determine how well a given feature can distinguish a hotword from other spoken words, the system can use information-gain-based feature selection. Information gain is a commonly used feature evaluation method where entropy of classification is compared in the presence and the absence of a given feature. Let G be the set of instances in which H are hotword instances and N are instances of other spoken words. Let E(G) be the entropy of G. If p(H) and p(N) are the fraction of hotword and non-hotword instances then E(G) can be calculated as $$E(G) = p_H \cdot \log_2(p_H) - p_N \cdot \log_2(p_N) \quad (6)$$

Let I(F) be the information gain of the feature F. I(F) can be calculated as $$I(F) = E(G) - \sum_{f \in V(F)} \frac{|G_f|}{|G|} E(G_f) \quad (7)$$

where V(F) is the set of values the feature F can take, and $G_f$ is the subset of G where the feature F=f. This way, I(F) can be considered as a measure of additional information available due to the presence of feature F in classifying the hotword and other words. The information gain values are between 0 and 1, where a higher value indicates that a feature is more useful in classification.

Filtering Out User Mobility Interference

Another challenge in using an accelerometer for hotword detection is to separate the accelerometer signals caused by the user's movements from the accelerometer signals caused by the user's voice. This is especially important because mobile devices, such as smartphones and smartwatches, constantly move when carried or worn by the user. Hence, it is desirable for the accuracy of hotword detection to remain high, even as the user moves.

To address this challenge, the system uses a high-pass filter to remove the mobility-related interference from the accelerometer signals before performing the hotword classification. There has been a considerable amount of research in recognizing human activities through accelerometer data. It is known that most human activities (such as walking, changing postures, etc.) exhibit lower frequencies (0.1-2 Hz). This means that a high-pass filter can be used to filter out the mobility-related interference from the accelerometer signal before calculating the features.

The problem, however, is to choose the correct cut-off frequency for the high-pass filter because attenuating signals more than necessary at the lower frequencies may also remove the distinguishing characteristics of hotwords. Because in this use case, the human voice is "received" by the accelerometer, high-pass filtering at 30 Hz can severely reduce the accuracy of hotword detection. Based on empirical observations, it has been determined that a cut-off frequency of approximately 2 Hz for a high-pass filter effectively filters out mobility-related interference from the accelerometer readings, while not adversely affecting the accuracy of hotword detection.

Classifier Training

While training the AccelWord classifier, a user is required to speak a hotword a certain number of times while the accelerometer data is collected. The user is also required to utter other randomly chosen words or sentences. Because typical hotwords are usually quite short, and most users can speak them in less than 2 seconds, the AccelWord system buffers 2 seconds of accelerometer data (400 samples) in a FIFO queue. (Note that this buffer size can be adjusted based on the typical time taken to speak the hotword.)

Once the training instances are generated by the user, the features are calculated and a machine-learning classifier is built (trained). The process of calculating features and building the classifier can be performed on a smartphone or similar portable device, or alternatively, can be offloaded to a server in the cloud for energy savings. Note that this process is only performed once and is not required to be repeated after the training is complete. Also, separate classifiers are not built for stationary and mobile use cases because doing so would require first detecting if the user is mobile or stationary. For all of the use cases, a single classifier is used whenever any mobility in training instances are filtered using the high-pass filter. Once the classifier is built, the classifier can perform the hotword detection in real time by monitoring the accelerometer data.

For real-time classification, the AccelWord system uses a simple sliding-window-based approach where at any time instance, the last t seconds of accelerometer signals are buffered. After a period of time, the features are calculated from the buffered data and signature matching is performed using the classifier to determine whether or not a hotword was spoken in the last t seconds. Because both the feature-calculation and classification operations are performed periodically, it is desirable to use a computationally efficient machine-learning classifier, such as a decision-tree-based classifier. Note that a decision-tree-based classifier can be implemented using simple if-else conditions, which means that it can perform the classification with very low computational overhead and, hence, low energy consumption.

However, in general, the system can use any type of classifier and is not limited to using simple decision-tree-based classifiers. More complex classifiers, such as decision trees with bagging or boosting, can improve hotword-detection accuracy. However, they also increase the computational cost and associated energy required for hotword detection.

Gyroscope-Based Implementation

A gyroscope is another type of MEMS sensor, which is widely used in smartphones and other smart devices. Moreover, a gyroscope is also similarly affected by a human voice signal. Hence, in some embodiments, the AccelWord system is reconfigured to operate using readings from a MEMS gyroscope instead of readings for a MEMS accelerometer.

Portable Electronic Device

Figure 1:
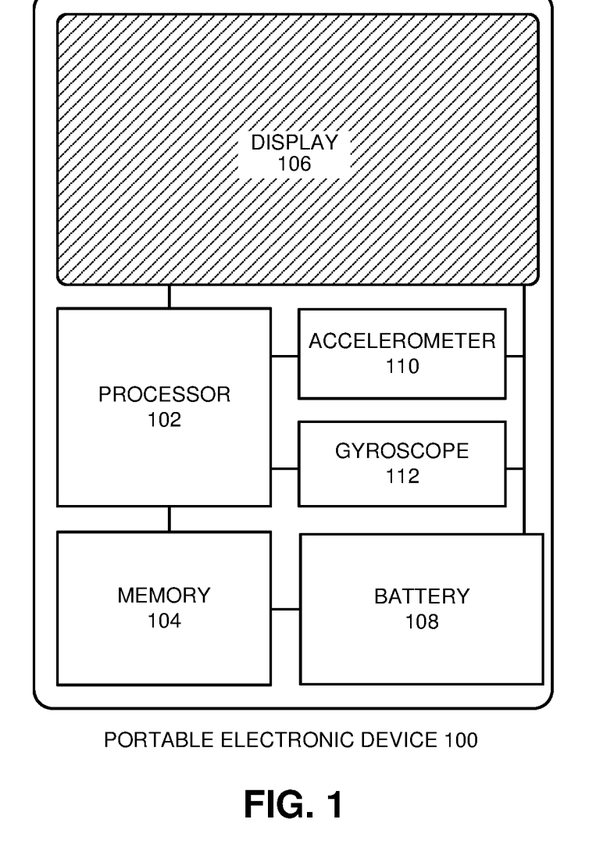
FIG. 1 illustrates a portable electronic device in accordance with the disclosed embodiments.

FIG. 1 illustrates a portable electronic device 100 in accordance with the disclosed embodiments. As mentioned above, portable electronic device 100 can generally include any battery-powered electronic device that can receive voice input, such as a smartphone; a smartwatch; a running watch; an activity tracker; a smart speaker; and smartglasses. Referring to FIG. 1, portable electronic device 100 includes a processor 102, a memory 104, a display 106, an accelerometer 110 and a gyroscope 112, which are all powered by a battery 108. Note that accelerometer 110 can include any type of accelerometer that can fit into a portable electronic device, such as a MEMS accelerometer. Similarly, gyroscope 112 can include any type of accelerometer that can fit into a portable electronic device, such as a MEMS gyroscope.

Process Flow Diagram

Figure 2:
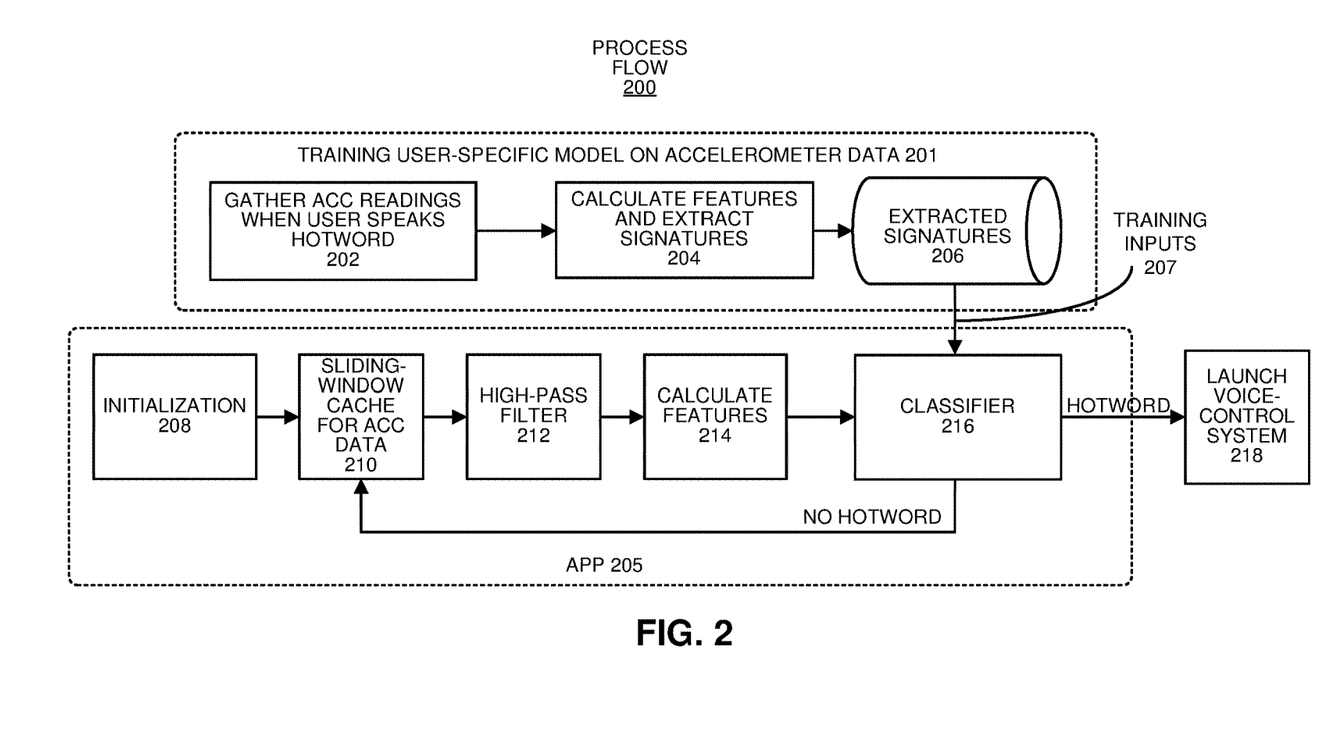
FIG. 2 illustrates an architecture for a hotword-detection system in accordance with the disclosed embodiments.

FIG. 2 presents a process flow diagram 200 for a hotword-detection system in accordance with the disclosed embodiments. The top portion of FIG. 2 illustrates a process flow for training a user-specific model on accelerometer data 201. During this training process 201, the system first gathers accelerometer readings when a user speaks hotwords 202. Next, the training flow calculates features and extracts signatures from the gathered accelerometer readings 204 to generate extracted signatures 206. These extracted signatures 206 are used as training inputs 207 while training a classifier that recognizes hotwords 216.

The bottom portion of FIG. 2 illustrates a process flow that takes place within an application 205 that executes on portable electronic device 100 (see FIG. 1). During this process flow, the system first performs an initialization operation 208, which initializes various components and data structures involved in performing hotword detection. This involves loading extracted signatures of the hotwords. Next, the system obtains accelerometer readings from a sliding-window-based cache for accelerometer data 210. These accelerometer readings feed through a high-pass filter 212, which filters out lower-frequency, user-mobility-related interference from the accelerometer readings. Next, the system calculates features 214 from the filtered accelerometer readings. The calculated features then feed into classifier 216, which was previously trained to recognize hotwords. If classifier 216 indicates that no hotwords are present, the system returns to operation 210 to gather more accelerometer data. On the other hand, if classifier 216 indicates that at least one hotword is present, the system launches a voice-control system 218.

Hotword-Detection Process

Figure 3:
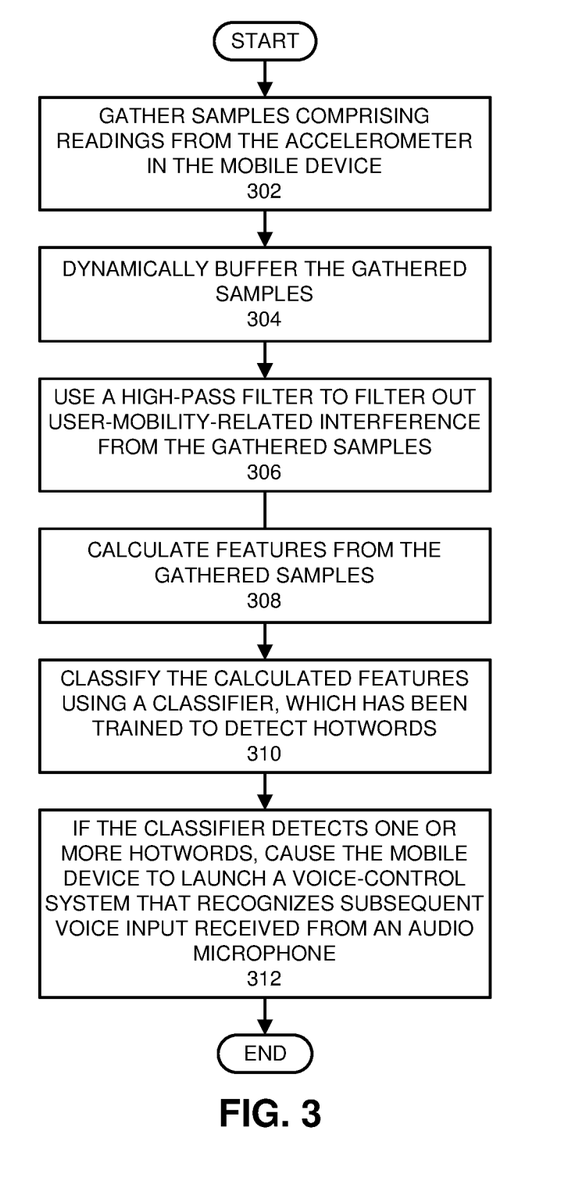
FIG. 3 presents a flow chart illustrating operations performed during the hotword-detection process in accordance with the disclosed embodiments.

FIG. 3 presents a flow chart illustrating operations performed during the hotword-detection process in accordance with the disclosed embodiments. During operation, the system gathers samples comprising readings from the accelerometer in the mobile device (step 302). Next, the system dynamically buffers the gathered samples (step 304) and uses a high-pass filter to filter out user-mobility-related interference from the gathered samples (step 306). The system then calculates features from the gathered samples (step 308), and classifies the calculated features using a classifier, which has been trained to detect hotwords (step 310). Finally, if the classifier detects one or more hotwords, the system causes the mobile device to launch a voice-control system that recognizes subsequent voice input received from an audio microphone (step 312).

Figure 4:
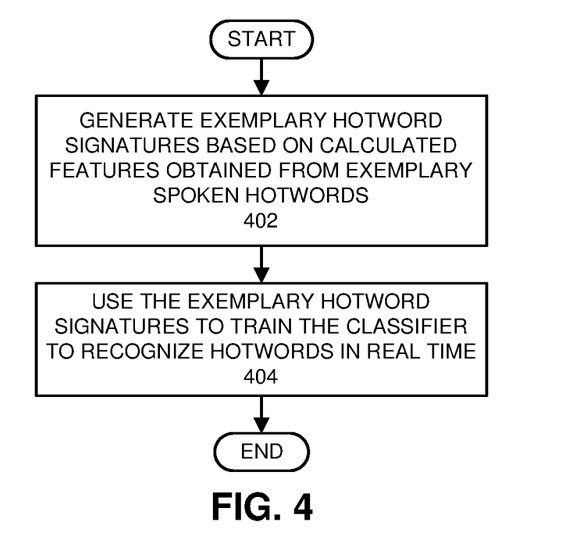
FIG. 4 presents a flow chart illustrating the process of training the classifier in accordance with the disclosed embodiments.

FIG. 4 presents a flow chart illustrating the process of training the classifier in accordance with the disclosed embodiments. First, the system generates exemplary hotword signatures based on calculated features obtained from exemplary spoken hotwords (step 402). The system then uses the exemplary hotword signatures to train the classifier to recognize hotwords in real time (step 402).

Figure 5:
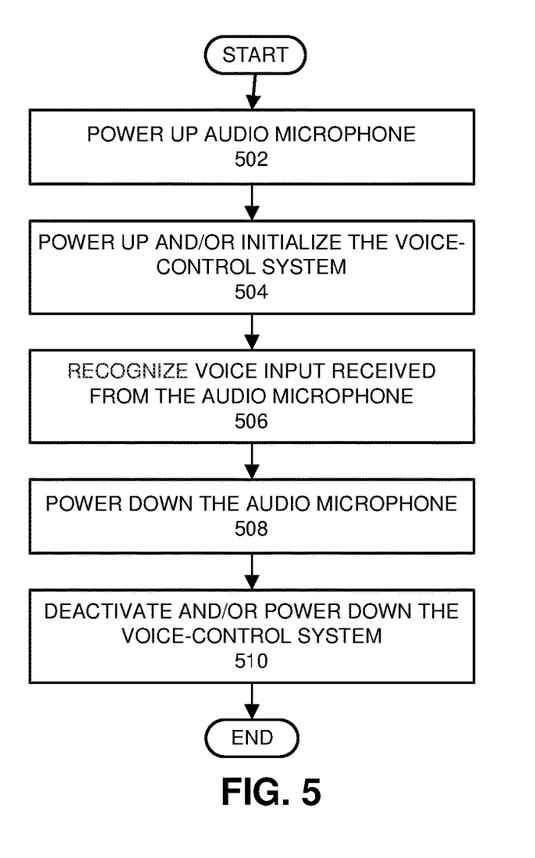
FIG. 5 presents a flow chart illustrating operations performed while activating and deactivating the voice-control system in accordance with the disclosed embodiments.

FIG. 5 presents a flow chart illustrating operations performed while launching and turning off the voice-control system in accordance with the disclosed embodiments. First, the system launches the voice-control system by: powering up the audio microphone (step 502); and powering up and/or initializing the voice-control system (step 504). The system then recognizes voice input received from the audio microphone (step 506). After the voice-control system finishes recognizing the voice input, the system turns off the voice-control system by: powering down the audio microphone (step 508); and deactivating and/or powering down the voice-control system (step 510).

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for using an accelerometer in a mobile device to detect hotwords, which activate a voice interface to recognize subsequent voice input, the method comprising:
   gathering samples comprising readings from the accelerometer in the mobile device;
   calculating features from the gathered samples;
   classifying the calculated features using a classifier, which has been trained to detect hotwords based on calculated features; and
   if the classifier detects one or more hotwords, causing the mobile device to launch a voice-control system that recognizes subsequent voice input received from an audio microphone.

2. The method of claim 1, wherein gathering the samples from the accelerometer additionally involves dynamically buffering the samples.

3. The method of claim 1, wherein prior to calculating the features, the method further comprises using a high-pass filter to filter out user-mobility-related interference from the gathered samples.

4. The method of claim 1, wherein prior to gathering the samples, the method further comprises training the classifier by:

generating exemplary hotword signatures based on calculated features obtained from exemplary spoken hotwords; and
using the exemplary hotword signatures to train the classifier to recognize hotwords in real time.

5. The method of claim 1, wherein the subsequent voice input comprises voice commands.

6. The method of claim 1, wherein causing the mobile device to launch the voice-control system comprises:
powering up the audio microphone; and
powering up and/or initializing the voice-control system.

7. The method of claim 6, wherein after the voice-control system finishes recognizing the subsequent voice input, the method further comprises:
powering down the audio microphone; and
deactivating and/or powering down the voice-control system.

8. The method of claim 1, wherein the accelerometer comprises a microelectromechanical systems (MEMS) accelerometer.

9. The method of claim 1, wherein the portable device comprises one of the following:
a smartphone;
a smartwatch;
a running watch;
an activity tracker;
a smart speaker; and
smartglasses.

10. A system that uses an accelerometer in a mobile device to detect hotwords, which activate a voice interface to recognize subsequent voice input, comprising:
an input, which receives samples comprising readings gathered from the accelerometer in the mobile device; and
a processing mechanism that:
calculates features from the gathered samples; and
classifies the calculated features using a classifier, which has been trained to detect hotwords based on calculated features; and
wherein if the classifier detects one or more hotwords, the voice interface activates a voice-control system to recognize subsequent voice input received from an audio microphone.

11. The system of claim 10, wherein the input includes a dynamic buffer, which used to dynamically buffer the gathered samples.

12. The system of claim 10, wherein the input includes a high-pass filter, which filters out user-mobility-related interference from the gathered samples before the features are calculated.

13. The system of claim 10, further comprising a training mechanism, which trains the classifier by:
generating exemplary hotword signatures based on calculated features obtained from exemplary spoken hotwords; and
using the exemplary hotword signatures to train the classifier to recognize hotwords in real time.

14. The system of claim 10, wherein the subsequent voice input comprises voice commands.

15. The system of claim 10, wherein while causing the mobile device to launch the voice-control system, the voice interface:
powers up the audio microphone; and
powers up and/or initializes the voice-control system.

16. The system of claim 15, wherein after the voice-control system finishes recognizing the subsequent voice input, the voice interface:
powers down the audio microphone; and
deactivates and/or powers down the voice-control system.

17. The system of claim 10, wherein the accelerometer comprises a microelectromechanical systems (MEMS) accelerometer.

18. The system of claim 10, wherein the portable device comprises one of the following:
a smartphone;
a smartwatch;
a running watch;
an activity tracker;
a smart speaker; and
smartglasses.

19. A method for using a gyroscope in a mobile device to detect hotwords, which activate a voice interface to recognize subsequent voice input, the method comprising:
gathering samples comprising readings from the gyroscope in the mobile device;
calculating features from the gathered samples;
classifying the calculated features using a classifier, which has been trained to detect hotwords based on calculated features; and
if the classifier detects one or more hotwords, causing the mobile device to launch a voice-control system that recognizes subsequent voice input received from an audio microphone.

20. The method of claim 19, wherein gathering the samples from the gyroscope additionally involves dynamically buffering the samples.

21. The method of claim 19, wherein prior to calculating the features, the method further comprises using a high-pass filter to filter out user-mobility-related interference from the gathered samples.

22. The method of claim 19, wherein prior to gathering the samples, the method further comprises training the classifier by:
generating exemplary hotword signatures based on calculated features obtained from exemplary spoken hotwords; and
using the exemplary hotword signatures to train the classifier to recognize hotwords in real time.

23. The method of claim 19, wherein the subsequent voice input comprises voice commands.

24. The method of claim 19, wherein causing the mobile device to launch the voice-control system comprises:
powering up the audio microphone; and
powering up and/or initializing the voice-control system.

25. The method of claim 24, wherein after the voice-control system finishes recognizing the subsequent voice input, the method further comprises:
powering down the audio microphone; and
deactivating and/or powering down the voice-control system.

26. The method of claim 19, wherein the gyroscope comprises a microelectromechanical systems (MEMS) gyroscope.

27. The method of claim 19, wherein the portable device comprises one of the following:
a smartphone;
a smartwatch;
a running watch;
an activity tracker;
a smart speaker; and
smartglasses.

* * * * *